United States Patent
Larry et al.

(10) Patent No.: US 12,468,194 B2
(45) Date of Patent: Nov. 11, 2025

(54) DUAL VIEW DISPLAY

(71) Applicant: Ford Global Technologies, LLC, Dearborn, MI (US)

(72) Inventors: Mark Larry, Macomb, MI (US); Dongwoo Kim, South Lyon, MI (US); Biaohe Guo, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/629,004

(22) Filed: Apr. 8, 2024

(65) Prior Publication Data
US 2025/0314929 A1    Oct. 9, 2025

(51) Int. Cl.
| | |
|---|---|
| G09G 5/00 | (2006.01) |
| B60K 35/215 | (2024.01) |
| B60K 35/22 | (2024.01) |
| B60K 35/23 | (2024.01) |
| B60K 35/81 | (2024.01) |
| G02B 27/01 | (2006.01) |
| G02F 1/1335 | (2006.01) |

(Continued)

(52) U.S. Cl.
CPC ...... G02F 1/133613 (2021.01); B60K 35/215 (2024.01); B60K 35/22 (2024.01);
(Continued)

(58) Field of Classification Search
CPC .............................. H04N 13/31; G02F 1/1323
See application file for complete search history.

(56) References Cited

U.S. PATENT DOCUMENTS

2007/0171193 A1*  7/2007  Nakamura ............. B60K 35/81
                                                        345/156
2010/0295755 A1* 11/2010  Broughton .......... G02F 1/13471
                                                        345/32

(Continued)

FOREIGN PATENT DOCUMENTS

| GB | 2406731 A | 4/2005 |
|---|---|---|
| JP | 2011252940 A | 12/2011 |
| WO | 2011072788 A2 | 6/2011 |

OTHER PUBLICATIONS

Hanson, "New 'Dual View' displays coming to production cars", Feb. 5, 2008, https://www.motorauthority.com/news/1025310_new-dual-view-displays-coming-to-production-cars.

(Continued)

Primary Examiner — Nan-Ying Yang
(74) Attorney, Agent, or Firm — Frank Lollo; Brooks Kushman P.C.

(57) ABSTRACT

A computer that includes a processor and a memory, the memory including instructions executable by the processor to provide direct backlighting to a display device by generating a first image at a first viewing angle during a first time period by energizing an LED zone to a first luminance, controlling a first LCD zone to be at a first transparency and controlling a second LCD zone to be non-transparent. A second image can be generated at a second viewing angle during a second time period by energizing the LED zone to a second luminance, controlling the first LCD zone to be non-transparent and controlling the second LCD zone to a second transparency. The first luminance can be transmitted through the first LCD zone disposed over the LED zone and directed at the first viewing angle by a parallax barrier when the first LCD zone is at the first transparency and the second luminance can be transmitted through the second LCD zone disposed over the LED zone and directed at a second viewing angle by the parallax barrier when the second LCD zone is at the second transparency.

20 Claims, 7 Drawing Sheets

(51) Int. Cl.
  *G02F 1/13357* (2006.01)
  *G09G 3/00* (2006.01)
  *G09G 3/34* (2006.01)
  *G09G 3/36* (2006.01)
  *B60K 35/65* (2024.01)
(52) U.S. Cl.
  CPC .............. *B60K 35/23* (2024.01); *B60K 35/81* (2024.01); *G02B 27/0101* (2013.01); *G02F 1/133512* (2013.01); *G02F 1/133603* (2013.01); *G09G 3/001* (2013.01); *G09G 3/3426* (2013.01); *G09G 3/36* (2013.01); *B60K 35/65* (2024.01); *B60K 2360/1526* (2024.01); *B60K 2360/27* (2024.01); *G09G 2380/10* (2013.01)

(56) References Cited

U.S. PATENT DOCUMENTS

| | | | | |
|---|---|---|---|---|
| 2012/0062991 | A1* | 3/2012 | Krijn | H04N 13/361 359/463 |
| 2012/0169861 | A1* | 7/2012 | Szczerba | G02B 27/01 348/78 |
| 2014/0043452 | A1* | 2/2014 | Ehrlacher | H04N 13/305 348/59 |
| 2021/0063783 | A1* | 3/2021 | Byoun | B60K 35/81 |
| 2022/0002594 | A1* | 1/2022 | Sugie | B32B 27/325 |

OTHER PUBLICATIONS

Technical Information—nLCD-elated—Dual view LCDs—Sharp.

\* cited by examiner

DUAL VIEW DISPLAY

BACKGROUND

Systems that move and/or that have mobile components, including vehicles, robots, drones, cell phones etc., can be operated by acquiring and processing sensor data, including data regarding system status and data regarding an environment around the system. Vehicle operation will be used herein as a non-limiting example of system operations. Computing devices included in a vehicle can format and output the data to display devices for vehicle occupants to view and interact with. A vehicle display device can display a wide variety of data including, but not limited to, vehicle control screens that control vehicle systems such a climate control and vehicle propulsion, vehicle status data such as vehicle speed, energy usage, and vehicle service notices, data regarding the environment around the vehicle such as traffic and navigation maps, entertainment data such as cable TV, movies, video games, and the Internet via web browsers, and cellular telephone data such as text messages. Vehicle data displays can display data generated by vehicle systems and vehicle computing devices and most data available on cable TV, the Internet, home or business computers and video game systems.

DETAILED DESCRIPTION

Figure 1:
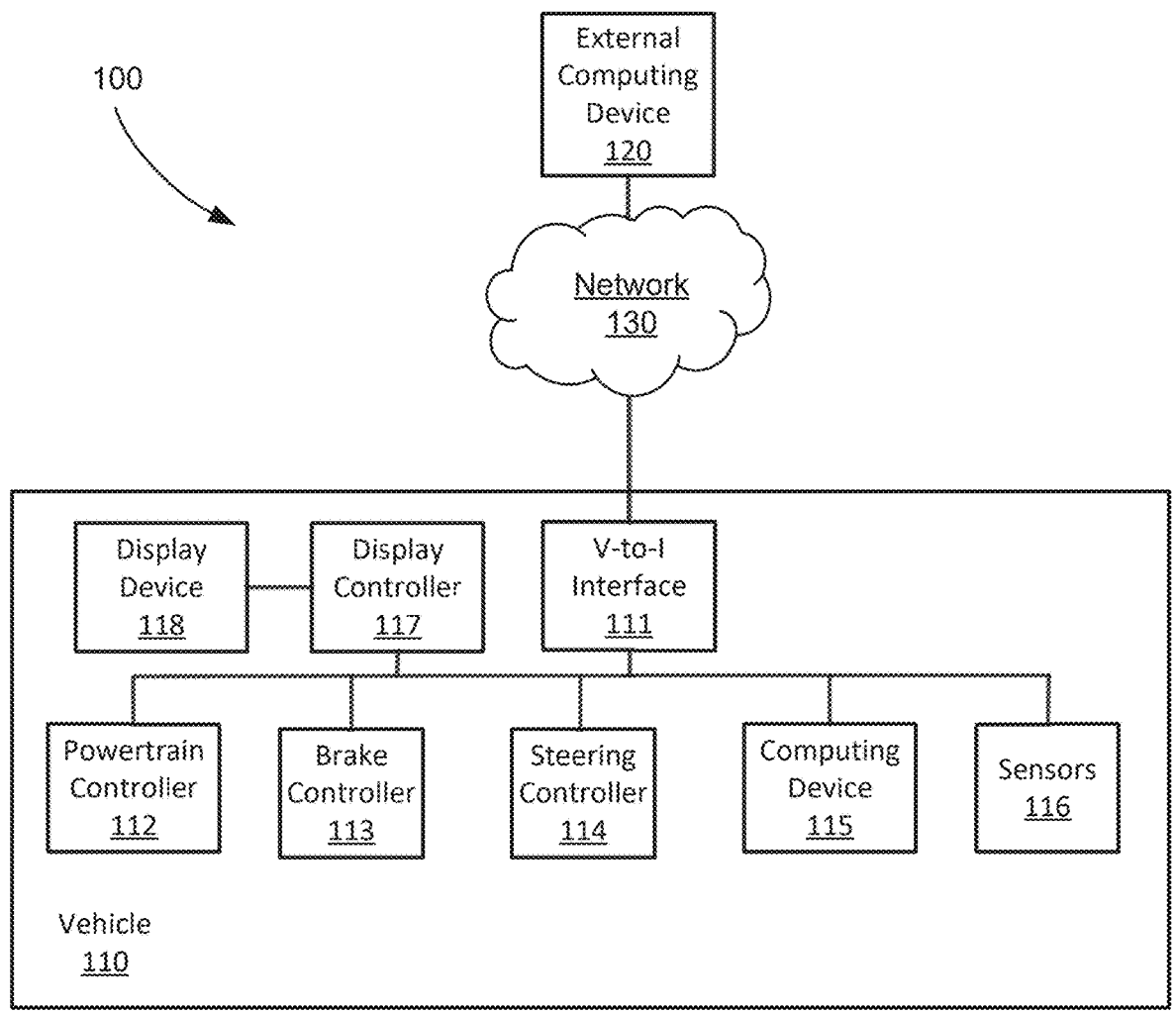
FIG. 1 is a block diagram of an example vehicle system.

Examples of a dual view display are discussed herein wherein the dual view display is implemented in a vehicle. Vehicle data that can be displayed on vehicle display devices include vehicle operating data such as vehicle speed, vehicle energy quantity, e.g., fuel or battery charge remaining, and alert messages regarding vehicle systems, e.g., low tire pressure warning, engine temperature warning, etc. Vehicle display devices can display the status of vehicle components such as climate control and lighting. Coupled with touch screen technology or voice recognition technology, a display device can display data regarding vehicle components and receive input from occupants regarding the control of vehicle components. Vehicle display devices can also be used to display image data from computing device memory or external sources such as the Internet. Examples of image data display include navigation data, videos, and web browsing.

Techniques described herein for dual view displays can enhance vehicle interiors by providing display devices that can display different data depending upon the direction in which the display device is viewed. A single dual view display can be located in a vehicle dashboard in a location that can be viewed by both a vehicle driver and a vehicle passenger. The dual view display can be controlled by programming to permit viewing of selected data based on vehicle occupant seating area locations. For example, a first occupant, expected to be a vehicle driver based on the location of occupant seating area, can view only a first selection of data on the dual view display while a second occupant, expected to be a passenger based on the location of the occupant seating area, can be permitted to view a second selection of data on the same display device at the same time. Because dual view display technology includes direct backlighting to a display device based on addressable arrays of light emitting diodes (LEDs), dual view displays can display a full range of data on both displays without interference by alternating displays at high frame rates. This permits two different types of data to be visible by two different users from a single display device that occupies only a single display size and location which can double the efficiency of display devices in a vehicle interior.

Disclosed herein is a method including providing direct backlighting to a display device by generating a first image at a first viewing angle during a first time period by energizing an LED zone to a first luminance, controlling a first LCD zone to be at a first transparency and controlling a second LCD zone to be non-transparent and generating a second image at a second viewing angle during a second time period by energizing the LED zone to a second luminance, controlling the first LCD zone be non-transparent and controlling the second LCD zone to a second transparency. The first luminance can be transmitted through the first LCD zone disposed over the LED zone and directed at the first viewing angle by a parallax barrier when the first LCD zone is at the first transparency and the second luminance can be transmitted through the second LCD zone disposed over the LED zone and directed at a second viewing angle by the parallax barrier when the second LCD zone is at the second transparency. The first viewing angle can be at a first angle relative to a display substrate formed by the first and second LCD zones and the second viewing angle is at a second angle relative to the display substrate formed by the first and second LCD zones.

Multiple LED zones and multiple first LCD zones can combine to project the first image at the first viewing angle based on the parallax barrier when the LED zones are at the first luminance and the first LCD zones are at the first transparency. The first image can be a dynamic image. Multiple LED zones and multiple second LCD zones can combine to project the second image at the second viewing angle when the LED zones are at the second luminance and the second LCD zones are at the second transparency. The second image can be a static image. The first transparency of the first LCD zone and the second transparency of the second LCD zone can vary over time and the first and second time periods alternate. The first LCD zone and the second LCD zone can be energized to non-transparency during alternating time periods. A vehicle dashboard can support the display device. A first occupant seating area and a second occupant seating area can be spaced from the first occupant seating area, the first viewing angle being toward the first occupant seating area and the second viewing angle being toward the second occupant seating area. A windshield, the first viewing angle can be toward the windshield to be visible as a heads-up display and the second viewing angle can be angled relative to the windshield to be visible as a direct display. The first time period and the second time period can alternate during a frame time. The first and second LCD zones can include twisted nematic LCDs. The first and second LCD zones can include paired polarization layers at 90 degree polarization angles.

Further disclosed is a computer readable medium, storing program instructions for executing some or all of the above method steps. Further disclosed is a computer programmed for executing some or all of the above method steps, including a computer apparatus, programmed to provide direct backlighting to a display device by generating a first image at a first viewing angle during a first time period by energizing an LED zone to a first luminance, controlling a first LCD zone to be at a first transparency and controlling a second LCD zone to be non-transparent and generate a second image at a second viewing angle during a second time period by energizing the LED zone to a second luminance, controlling the first LCD zone be non-transparent and controlling the second LCD zone to a second transparency. The first luminance can be transmitted through the first LCD zone disposed over the LED zone and directed at the first viewing angle by a parallax barrier when the first LCD zone is at the first transparency and the second luminance can be transmitted through the second LCD zone disposed over the LED zone and directed at a second viewing angle by the parallax barrier when the second LCD zone is at the second transparency. The first viewing angle can be at a first angle relative to a display substrate formed by the first and second LCD zones and the second viewing angle is at a second angle relative to the display substrate formed by the first and second LCD zones.

The instructions can include further instructions to combine multiple LED zones and multiple first LCD zones project the first image at the first viewing angle based on the parallax barrier when the LED zones are at the first luminance and the first LCD zones are at the first transparency. The first image can be a dynamic image. Multiple LED zones and multiple second LCD zones can combine to project the second image at the second viewing angle when the LED zones are at the second luminance and the second LCD zones are at the second transparency. The second image can be a static image. The first transparency of the first LCD zone and the second transparency of the second LCD zone can vary over time and the first and second time periods alternate. The first LCD zone and the second LCD zone can be energized to non-transparency during alternating time periods. A vehicle dashboard can support the display device. A first occupant seating area and a second occupant seating area can be spaced from the first occupant seating area, the first viewing angle being toward the first occupant seating area and the second viewing angle being toward the second occupant seating area. A windshield, the first viewing angle can be toward the windshield to be visible as a heads-up display and the second viewing angle can be angled relative to the windshield to be visible as a direct display. The first time period and the second time period can alternate during a frame time. The first and second LCD zones can include twisted nematic LCDs. The first and second LCD zones can include paired polarization layers at 90 degree polarization angles.

FIG. 1 is a diagram of vehicle system 100. Vehicle system 100 includes a vehicle 110. The vehicle 110 is generally a land-based vehicle 110 capable of autonomous and semi-autonomous operation and having three or more wheels, i.e., a passenger car, light truck, etc. Vehicle 110 includes one or more sensors 116, the V2I interface 111, a computing device 115, one or more controllers 112, 113, 114, 117 and a display device 118. One or more vehicle computing devices 115 can receive data regarding the operation of the vehicle 110 from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (i.e., control of acceleration in the vehicle 110 by controlling one or more of an internal combustion engine, electric motor, hybrid engine, etc.), steering, climate control, interior and exterior lights, etc., as well as to determine whether and when the computing device 115, as opposed to a human operator, is to control such operations. The computing device 115 can also control the temporal alignment of lighting to sensor acquisition to account for the color effects of vehicle lights or external lights.

The computing device 115 may include or be communicatively coupled to, i.e., via a vehicle communications bus as described further below, more than one computing devices, i.e., controllers or the like included in the vehicle 110 for monitoring and controlling various vehicle components, i.e., a propulsion controller 112, a brake controller 113, a steering controller 114, display controller 117 etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in vehicle 110 and receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network. In addition, the computing device 115 may be configured for communicating through a vehicle-to-infrastructure (V2I) interface 111 with an external computing device 120, i.e., a cloud server, via a network 130, which, as described below, includes hardware, firmware, and software that permits computing device 115 to communicate with an external computing device 120, which can include the Internet via a network 130 such as wireless Internet (WI-FI®) or cellular networks. V2X interface 111 may accordingly include processors, memory, transceivers, etc., configured to utilize various wired and wireless networking technologies, i.e., cellular, BLUETOOTH®, Bluetooth Low Energy (BLE), Ultra-Wideband (UWB), Peer-to-Peer communication, UWB based Radar, IEEE 802.11, and other wired and wireless packet networks or technologies. The computing device 115 also includes nonvolatile memory such as is known.

As already mentioned, generally included in instructions stored in the memory and executable by the processor of the computing device 115 is programming for operating one or more vehicle 110 components, i.e., braking, steering, propulsion, etc., without intervention of a human operator. Using data received in the computing device 115, i.e., the sensor data from the sensors 116, an external computing device 120, etc., the computing device 115 may make various determinations and control various vehicle 110 components and operations. For example, the computing device 115 may include programming to regulate or control vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and control a specific vehicle subsystem. Examples include a propulsion controller 112, a brake controller 113, a steering controller 114 and a display controller 117. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from another ECU included in vehicle 110, e.g., the computing device 115, to operate the brakes of the vehicle 110.

The one or more controllers 112, 113, 114, 117 for the vehicle 110 may include known electronic control units (ECUs) or the like including, as non-limiting examples, one or more propulsion controllers 112, one or more brake controllers 113, one or more steering controllers 114 and one or more display controllers. Each of the controllers 112, 113, 114, 117 may include respective processors and memories and one or more actuators. The controllers 112, 113, 114, 117 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices such as are known to provide data via the vehicle communications bus. Sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114, 117 in the vehicle 110, connectivity between components, and accurate and timely performance of components of the vehicle 110.

Display device 118 displays two-dimensional visual data to occupants of a vehicle. Display device 118 can display visual data in monochrome or color and the visual data can be updated at a frame rate, which can be 60 frames per second, for example. Displayed visual data can be a static image, where the majority of the two dimensional area does not change from frame to frame, or a dynamic image, where the majority of the two dimensional area changes from frame to frame. Visual data to be displayed on display device 118 can be generated by display controller 117. Display controller 117 is a computing device such as an ECU or the like that can receive data to be displayed on display device 118 in a visual format from computing device 115, other vehicle ECUs, or from an external computing device 120 via network 130.

Figure 2:
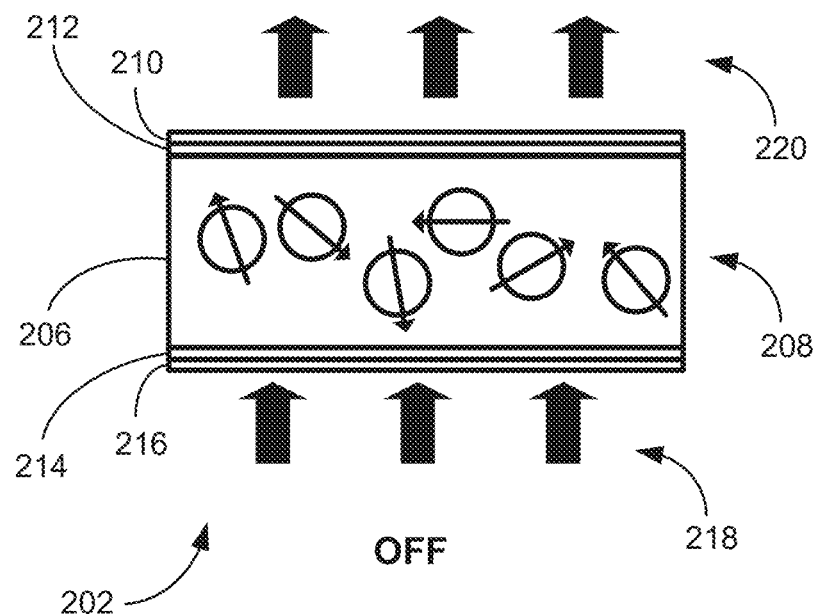
FIG. 2 is a diagram of an example liquid crystal display (LCD).
Figure 2:
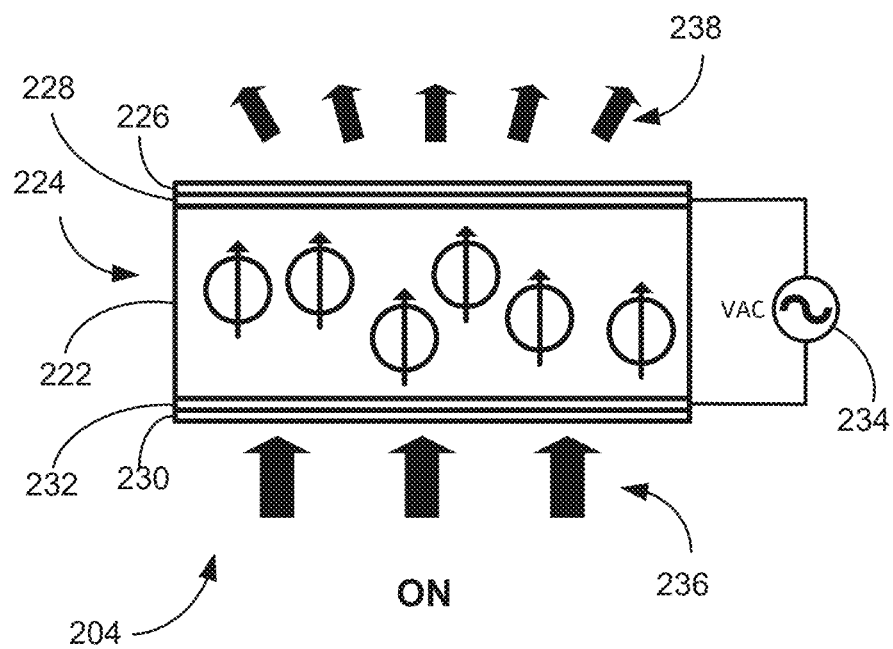

FIG. 2 is a diagram of two cross sectional views of portions of liquid crystal displays (LCDs) 202, 204. LCD 202 is a cross sectional view of a twisted nematic liquid crystal display in an ON state and LCD 204 is a cross sectional view of a twisted nematic liquid crystal display in an OFF state. A liquid crystal display includes two paired polarizer layers 210, 216 and 226, 230. The paired polarizer layers 210, 216 are arranged to be at 90 degree polarization angles (normally off) or 0 degrees (normally on) depending upon the desired appearance of the display. The interior space 206, 222 of the LCDs can be filled with liquid crystal molecules 208, 224, which can be a material that rotationally polarizes light such as a twisted nematic liquid crystal molecule. LCDs 202, 204 do not emit light directly, but transmit varying degrees of input light 218, 236, depending upon voltage 234 applied across paired electrodes 212, 214 and 228, 232, generating output light 220, 238. The electrodes can be applied to a glass substrate and can be made of a transparent, conductive material such as indium-tin oxide (ITO).

Assuming a normally ON (i.e., providing 90 degree polarization when input light is applied) LCD 202, then in the OFF state, the liquid crystal molecules 208 assume a helical pattern between the electrodes 212, 214. The helical pattern imparts a 90 degree polarization in light 218 being transmitted by LCD 202. The 90 degree polarization imparted to the light causes the input polarizer 216 to match the output polarizer 210, which permits a large percentage of the input light 218 to appear as output light 220. Applying a voltage 234 across the electrodes 228, 232 causes the liquid crystal molecules 224 to line up with one end towards one electrode 228 and the other end towards the other electrode 232, which prevents the liquid crystal molecules from imparting a polarization to the input light 236 which then permits the crossed polarizer layers 226, 230 to block light, making the LCD 204 non-transmissive and reducing the light output 238 from the LCD 204. Varying voltage 234 can change the light output 220, 238 from bright (no voltage) to dark (maximum voltage) depending upon the voltage.

In addition to varying voltage 234 to determine light output 238, light output 220, 238 can depend upon the light input 218, 236. A technique for supplying light input 218, 236 to an LCD 202, 204 is to apply a reflective layer of material beneath the lower polarizer 216, 230 to reflect light incident on the LCD 202, 204 from above. This technique has the advantage of requiring no power or wiring but is dependent upon ambient lighting to make the LCD 202, 204 legible. Backlighting is a technique for applying illumination to an LCD 202, 204 from beneath the lower polarizer 216, 230. Techniques for backlighting include edge lighting, which supplies light to a transparent layer of material from the lateral edges of the LCD 202, 204 and cold cathode fluorescent lamps. These technologies supply uniform light to backlight the entire LCD 202, 204.

Figure 3:
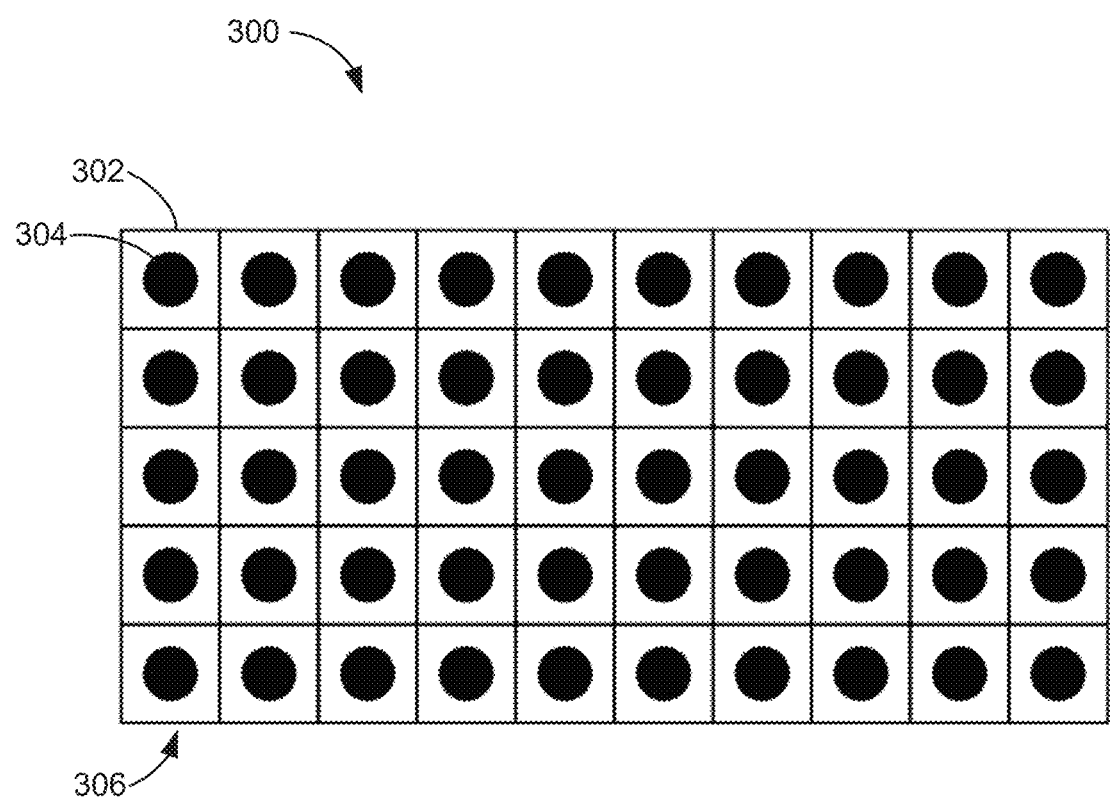
FIG. 3 is a diagram of an example vehicle display.

Techniques discussed herein for dual view displays provide backlighting by employing an addressable LED array to backlight an LCD 202, 204. As illustrated in FIG. 3, an addressable LED array includes one or more LEDs in addressable zones, meaning that the LEDs in each zone can be controlled separately. Each LED zone can include multiple LEDs, for example red, green and blue, which can be controlled separately to yield any color including white light at any intensity from off (black) to the maximum intensity of the LEDs. This permits the LED backlight to illuminate a dual view display to project two different displayed images based of two different types of data having two different types of backlight requirements simultaneously.

FIG. 3 is a diagram of an example LED backlight 300. LED backlight includes an array of LEDs 304 arranged in LED zones 302. Each LED zone 302 can include one or more LEDs 304. For example, LED zones 302 can include red, green, and blue LEDs 304 that combine to create color backlighting, including white light. LEDs 304 in LED zones 302 can be controlled separately to generate backlighting patterns to support a dual view display. As described below in relation to FIG. 4, LEDs 304 in LED zones 302 can be energized to different levels of luminance and different colors while adjacent LCDs 412, 414, 416, 418 are energized to different levels transparency and non-transparency to generate dual view display data at different viewing angles.

Figure 4:
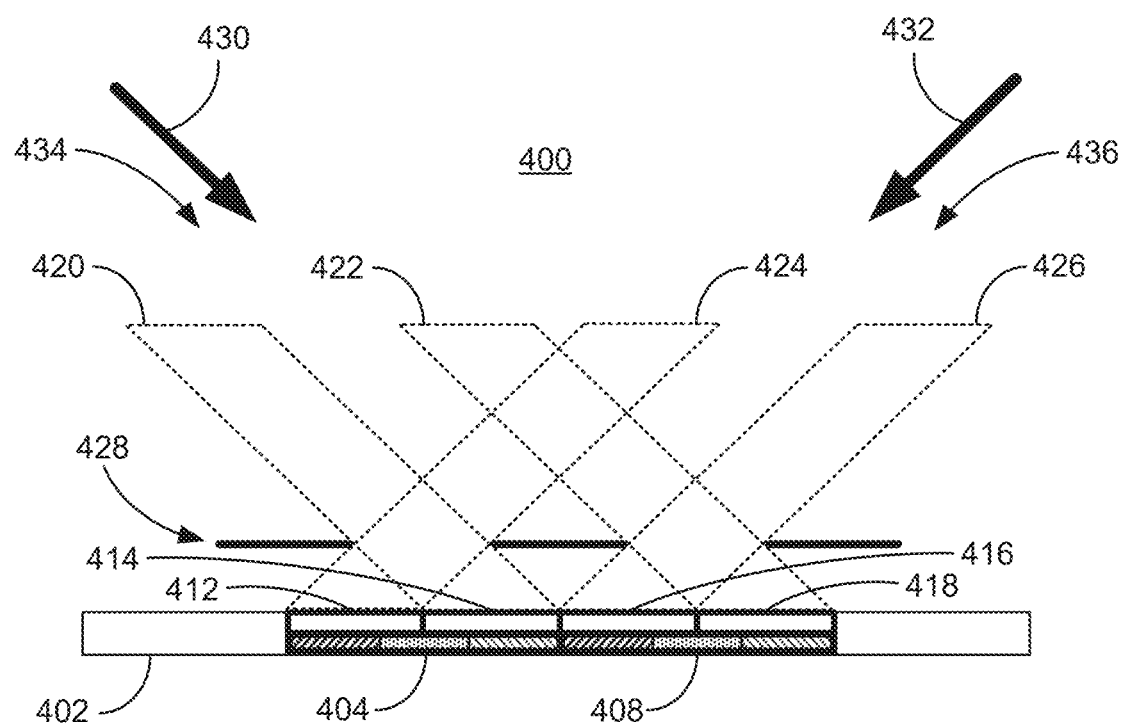
FIG. 4 is a diagram of an example light emitting diode (LED) array.

FIG. 4 is a diagram of an example cross-sectional view of a dual view display 400. Dual view display 400 is a display device 118 that includes display substrate 402 that includes LED zones 404, 408 and matching LCD zones 412, 414, 416, 418, respectively, disposed in a plane formed by display substrate 402. LED zones 404, 408 can include red, green, and blue LEDs, illustrated by three different types of cross-hatching, and are constructed as illustrated in FIG. 3. LEDs included in LED zones 404, 408 emit different levels of luminance, e.g. light, and different colors in response to being energized by differing voltages applied to the LEDs in LED zones 404, 408 by display controller 117 to provide backlighting for LCD zones 412, 414, 416, 418. LCD zones 412, 414, 416, 418 are constructed as illustrated in FIG. 2 and are wired to be individually controllable by a display controller 117, e.g., to transmit or block light emitted by LED zones 404, 408 to emit dual view display data. LCD zones 412, 414, 416, 418 transmit varying amounts of luminance emitted by LED zones 404, 408, in response to being energized by voltages applied to the LCD zones 412, 414, 416, 418 by display controller 117 to switch the LCD zones between transparency and non-transparency.

Dual view display can be generated by first display data 424, 426 combining to form a first image 436 at a first viewing angle 432 during a first time period and second display data 420, 422 can combine form a second image 434 at a second viewing angle 430 during a second time period. To form first image 436 at first viewing angle 432 during the first time period, LED zones 404, 408 can be energized at a first voltage to generate a first luminance and a first color. During the first time period, while LED zones 404, 408 can be energized at the first voltage, LCD zones 412, 416 can be energized at a third voltage level that causes LCD zones 412, 416 become transparent and transmit first luminance and first color from LED zones 404, 408 as first display data 424, 426 through parallax barrier 428 to form first image 436 at first viewing angle 432. During the first time period LCD zones 414, 418 can be energized at a fourth voltage level to become non-transparent and restrict transmission of the first luminance and first color from LED zones 404, 408 so that no light is emitted through parallax barrier 428 and no second image 434 is formed by second display data 420, 422 at viewing angle 430.

At a second time period second display data 420, 422 can combine to form a second image 434 at a second viewing angle 430 by energizing LED zones 404, 408 at a second voltage to generate a second luminance and a second color. At the second time period LCD zones 414, 418 are energized at the third voltage level to become transparent and transmit second luminance and second color from LED zones 404, 408 through parallax barrier 428 as second display data 420, 422 to form second image 434 at second viewing angle 430. During second time period while LCD zones 412, 416 are energized at the fourth voltage level to become non-transparent and prevent transmission of second luminance and second color from LED zones 404, 408 through parallax barrier 428 to form a first image 436 at the first viewing angle 432.

The first and second time periods can be alternated at 60 Hz or greater, for example, to permit human visual persistence to perceive the first image 436 and the second image 434 as continuous despite switching on and off at alternate time periods 60 or more times per second. Changing the location of the parallax barrier 428 with respect to the display substrate 402 can change the first viewing angle 432 and the second viewing angle 430. For example, the first viewing angle 432 can be made perpendicular to the display substrate 402 while the second viewing angle 430 can remain at an oblique angle to the display substrate 402 by moving the parallax barrier further away from the display substrate 402.

A dual view display 400 can include multiple LED zones, multiple first LCD zones and multiple second LCD zones. The multiple LED zones, multiple first LCD zones and multiple second LCD zones can be arranged in a two-dimensional pattern in the display substrate as columns or staggered rectangular array, for example, as long as the angular relationship between openings in the parallax barrier and the first and second LCD zones are maintained to provide first and second viewing angles 430, 432. Changing LED zone 404, 408 luminance while switching LCD zone 412, 414, 416, 418 at two time periods as described above can permit a single display device 118 to perform as a dual view display while minimizing computational resources required in display controller 117 to generate first and second images 434, 436 at first and second viewing angles 430, 432.

Figure 5:
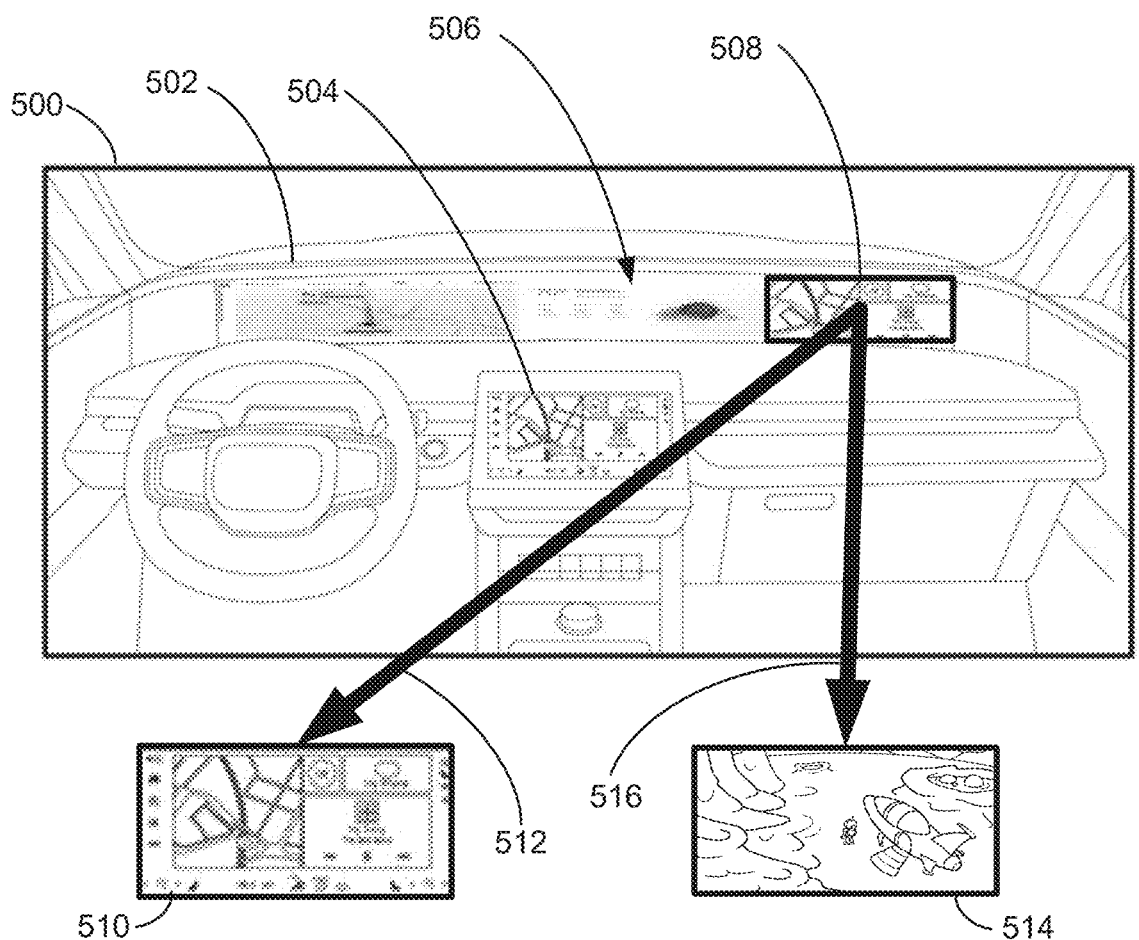
FIG. 5 is a diagram of an example vehicle interior including a dual view display.

FIG. 5 is a diagram of an example dual view display 508 included in a view of a portion of a vehicle 110 interior 500. The vehicle interior 500 is a forward facing view that illustrates a vehicle dashboard 502. The dashboard 502 includes a conventional display 504 that is visible from a range of angles that includes occupants in multiple locations in vehicle 110, namely both a driver and a passenger. Dashboard also includes a panoramic display 506 that extends from the left side of dashboard 502 directly in front of a driver to the right side of the dashboard 502 directly in front of a passenger. The panoramic display can be divided into multiple display areas that display multiple types of display data including a dual view display 508. The dual view display 508 can be arranged to display first display data 510 visible at a first viewing angle 512 and second display data 514 visible at a second viewing angle 516.

First display data 510 can include display data that is relevant to a driver of a vehicle 110, for example navigation data or vehicle status data. Second display data 514 can include display data that can be considered not relevant to a driver, but relevant to a passenger, for example a movie or a web browser. Dual view display 508 techniques can enhance vehicle 110 displays by displaying data that is appropriate to or intended for different occupants while the respective data is provided via a shared display area. Display data can be a static image, where changes to the luminance and transparency levels of the LED zones and LCD zones occur at less than video frame rates, e.g., slower than 60 frames per second, and generally do not change more than a small percentage of the display area. For example, a static image might be data included in a climate control panel display, where the changes only occur is response to occupant input or changes in vehicle interior temperature. Other types of display data can be a dynamic image, where changes to luminance and transparency levels of the LED zones and LCD zones can occur at frame rates and change large percentages of the display area. Examples of a dynamic image include video content and web browsers.

Figure 6:
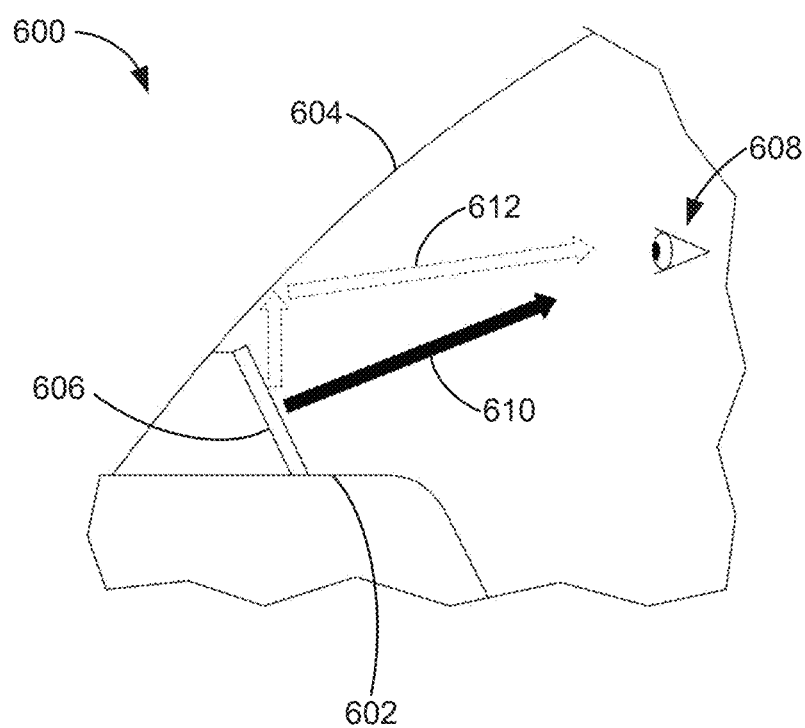
FIG. 6 is a diagram of an example dual view display.

FIG. 6 is a diagram of a second example of a dual view display 606 included in a portion of a vehicle 110 interior 600. FIG. 6 includes a side view of a vehicle 110 interior 600, illustrating a dashboard 602 and a windshield 604. Dual view display 606 emits first display data at a first viewing angle 610 towards an occupant. Dual view display 606 emits second display data at a second viewing angle 612 towards an occupant 608 by reflecting the second display data off the windshield 604. Reflecting the second display data off the windshield 604 forms a heads-up display (HUD), which creates a virtual image that makes the second display data appear to hover in mid-air in front of the windshield 604. A HUD permits an occupant 608 of a vehicle 110 to view the second display data without moving their eyes from the field of view in front of the vehicle.

Luminance requirements for direct display, for example display data viewed at first viewing angle 610, can benefit from a display luminance of 1000 to 3000 Nits. A Nit is a unit of measurement used to measure brightness of electronic displays and is measured in candelas per square meter, where a candela is the luminous power per unit solid angle weighted by a luminous intensity function of the human eye. A HUD, for example display data viewed at second viewing angle 612, can require a display luminance of 7000 to 10,000 Nits. Techniques included in a dual view display as described herein can provide the two different luminous intensities required for both direct displays and HUDs.

Figure 7:
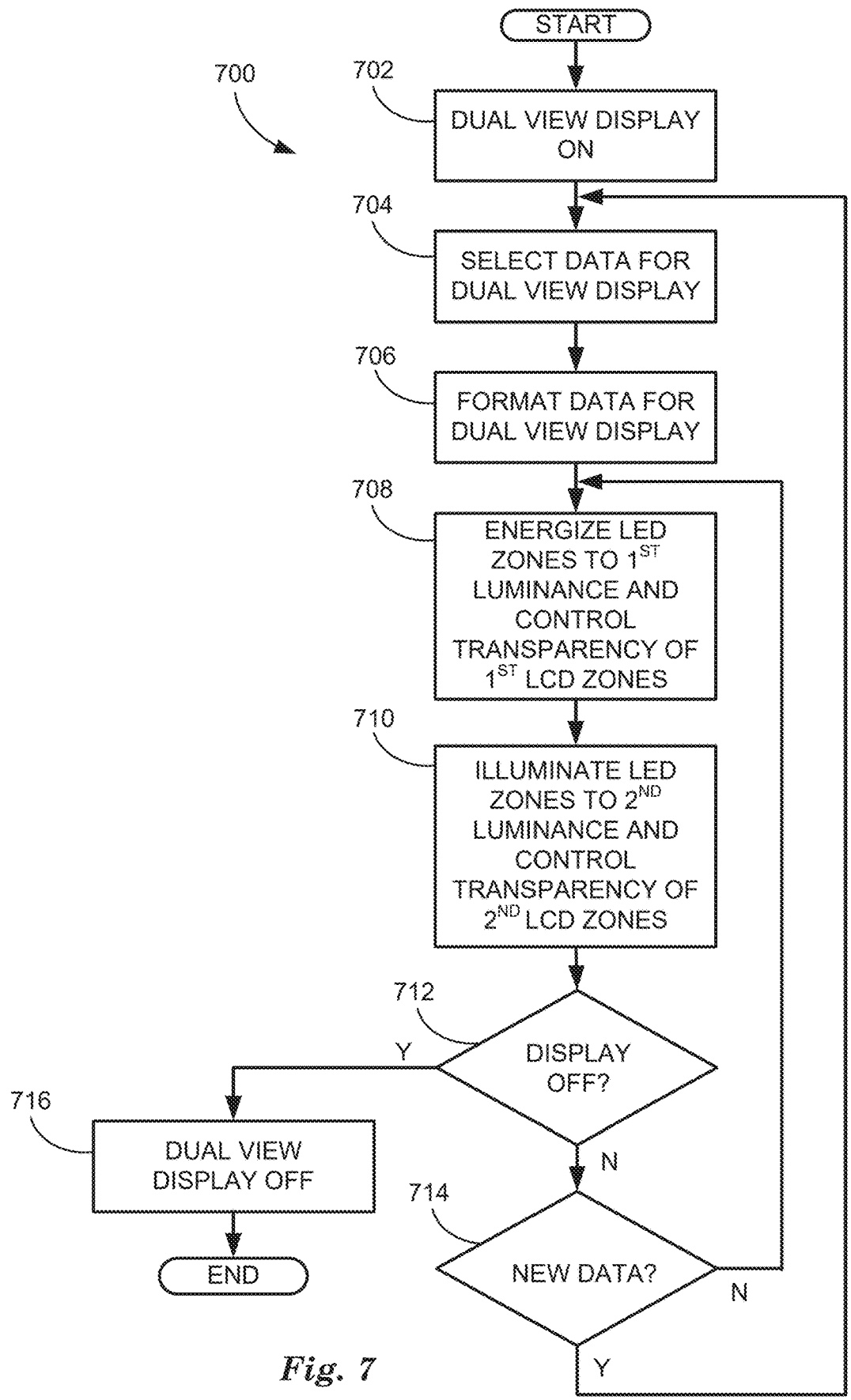
FIG. 7 flowchart diagram of an example process to display data on a dual view display.

FIG. 7 is a flowchart diagram of a process 700 for displaying two or more images at two viewing angles 430, 432 from one dual view display 400. Process 700 can be implemented as software executing on a computing device 115 and hardware including a dual view display as described herein. Process 700 includes multiple blocks that can be executed in the illustrated order. Process 700 could alternatively or additionally include fewer blocks and can include the blocks executed in different orders.

Process 700 begins in block 702, where a display controller 117 is commanded to turn on a dual view display 400. The command to turn on the dual view display 400 can be part of an initialization process that is started whenever computing device 115 senses an occupant entering the vehicle or the dual view display 400 can be commanded to turn on by an event such as an occupant request. For example, the display 400 can be used in the vehicle 110 for various kinds of content or data, as mentioned above. For example, content based on data received from vehicle sensors 116 could be displayed, e.g., relating to an external or internal temperature, vehicle speed, a status of various vehicle 110 systems, etc. Yet further alternatively or additionally, the display 400 could provide entertainment content, e.g., video entertainment or web browsing for an occupant.

At block 704 the display controller 117 determines two types of display data to display on the dual view display 400. Computing device 115 or display controller 117 can include lists of types of display data that are permissible for each portion of the dual view display 400. Default display data can be selected initially and later overridden by occupant selection or change in vehicle status, for example, based on the permissible types of display data.

At block 706 the display controller 117 can format display data for the two different types (e.g., a first type could be vehicle 110 data such as speed, temperature, etc., and a second type could be entertainment data such as a video presentation, content from a web browser, etc.) of display data to display to occupants of a vehicle 110 in two different seating areas using a single dual view display 400. The dual view display 400 can also display two different displays to a single occupant of a vehicle 110 where a first display is a direct display and a second display is a heads-up display, for example. First display data 424, 426 can be formatted as first image 426 data to be displayed by LED zones 404, 408 and first LCD zones 412, 416 and second display data 420, 422 can be formatted as second image 434 to be displayed by LED zones 404, 408 and second LCD zones 414, 418 at alternating time intervals of a frame time.

At block 708 display controller 117 can energize one or more LEDs 304 included in LED zones 404, 408 at a first luminance. LED zones 404, 408 can include red, green, and blue LEDs 304, for example, and the command to energize the LEDs 304 can include commands to energize the LEDs 304 to generate a first color. Display controller 117 can energize first LCD zones 412, 416 to become transparent while LED zones 404, 408 are energized to a first luminance which, in cooperation with parallax barrier 428 generates a first image 436 from display data 424, 426 to be viewed at a first viewing angle 432 during a first time period included in a frame time. During the first time period display controller 117 can energize second LCD zones 414, 418 to be energized to non-transparency to prevent second display data 420, 422 from being displayed as a second image 434 at a second viewing angle 430.

At block 710 display controller 117 can energize one or more LEDs 304 included in LED zones 404, 408 to a second luminance. LED zones 404, 408 can include red, green, and blue LEDs 304, for example, and the commands to energize the LEDs 304 can include commands to energize the LEDs 304 to generate a second color. Display controller can energize second LCD zones 414, 418 to become transparent while LED zones 404, 408 are energized to a second luminance, which, in cooperation with parallax barrier 428 generates a second image 434 formed by second display data 420, 422 to be viewed at a second viewing angle 430 during a second time period included in a frame time. During the second time period display controller 117 can energize first LCD zones 414, 416 to be non-transparent to prevent first display data 424, 426 from being displayed as an image 436 at a first viewing angle 432. Dual view display 400 is accomplished by display controller 117 alternately displaying first display data 424, 426 as a first image 436 at first viewing angle 432 at a first time period and second display data 420, 422 as a second image 434 at second viewing angle 430 at a second time period by energizing LED zones 404, 408 and LCD zones 412, 414, 416, 418 as described in blocks 708 and 710.

At block 712 display controller 117 determines if the dual view display 400 is to be turned off. Dual view display 400 can be turned off at a time the vehicle 110 is stopped and occupants exit the vehicle or by command from an occupant, for example. If the dual view display 400 is to keep running, process 700 passes to block 714. If the dual view display 400 is to be turned off, process 700 branches to block 716.

At block 714 display controller 117 determines whether the dual view display 400 has new display data for either of the two display views included in the dual view display. Dual view display 400 can operate on a fixed frame time, for example 60 frames per second, meaning that blocks 708, 710 can be executed to display first image 436 and second image 434 in one frame time. At the end of the frame time, display controller 117 determines whether the same display data that was formatted to be displayed by the dual view display 400 in the current frame time is to be displayed again in the next frame time. If the data included in both first image 436 and second image 434 is unchanged, e.g., a static image, process 700 returns to block 708 to display the same display data in the next frame time. In examples where either first image 436 or second image 434 has changed, e.g., either first image 436 or second image 434 is a dynamic image which can change at each frame, process 700 returns to block 704 to permit display controller to select and format new display data for either one or both first image 436 and second image 434.

At block 716 computing device 115 can turn the dual view display 400 off. This could be based on a command received from an occupant of vehicle 110 or in response to computing device 115 determining that the vehicle 110 is stopped and the occupants have exited the vehicle 110. Following block 716 process 700 ends.

Any action taken by a vehicle or user of the vehicle in response to one or more navigation prompts disclosed herein should comply with all rules and regulations specific to the location and operation of the vehicle (e.g., Federal, state, country, city, etc.). More so, any navigation prompts disclosed herein are for illustrative purposes only. Certain navigation prompts may be modified and omitted depending on the context, situation, and applicable rules and regulations. Further, regardless of the navigation prompts, users should use good judgement and common sense when operating the vehicle. That is, all navigation prompts, whether standard or "enhanced," should be treated as suggestions and only followed when safe to do so and when in compliance with any rules and regulations specific to the location and operation of the vehicle.

Computing devices such as those described herein generally each includes commands executable by one or more computing devices such as those identified above, and for carrying out blocks or steps of processes described above. For example, process blocks described above may be embodied as computer-executable commands.

Computer-executable commands may be compiled or interpreted from computer programs created using a variety of programming languages and technologies, including, without limitation, and either alone or in combination, Java™, C, C++, Python, Julia, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system comprising:
a computer including a processor and a memory storing instructions executable by the processor to:
provide direct backlighting to a display device by generating a first image at a first viewing angle during a first time period by energizing an LED backlight zone to a first luminance, controlling a first LCD display zone to be at a first transparency and controlling a second LCD display zone to be non-transparent;
generate a second image at a second viewing angle during a second time period by energizing the LED backlight zone to a second luminance, controlling the first LCD display zone to be non-transparent and controlling the second LCD display zone to a second transparency; and
wherein the first luminance is transmitted through the first LCD display zone disposed over the LED backlight zone and directed at the first viewing angle by a parallax barrier when the first LCD display zone is at the first transparency and the second luminance is transmitted through the second LCD display zone disposed over the LED backlight zone and directed at a second viewing angle by the parallax barrier when the second LCD display zone is at the second transparency.

2. The system of claim 1, wherein the first viewing angle is at a first angle relative to a display substrate formed by the first and second LCD display zones and the second viewing angle is at a second angle relative to the display substrate formed by the first and second LCD display zones.

3. The system of claim 1, wherein multiple LED backlight zones and multiple first LCD display zones combine to project the first image at the first viewing angle based on the parallax barrier when the LED backlight zones are at the first luminance and the first LCD display zones are at the first transparency.

4. The system of claim 3, wherein the first image is a dynamic image.

5. The system of claim 1, wherein multiple LED backlight zones and multiple second LCD display zones combine to project the second image at the second viewing angle when the LED backlight zones are at the second luminance and the second LCD display zones are at the second transparency.

6. The system of claim 5, wherein the second image is a static image.

7. The system of claim 1, wherein the first transparency of the first LCD display zone and the second transparency of the second LCD display zone vary over time and the first and second time periods alternate.

8. The system of claim 1, wherein the first LCD display zone the second LCD display zone are energized to non-transparency during alternating time periods.

9. The system of claim 1, further comprising a vehicle dashboard supporting the display device.

10. The system of claim 1, further comprising a first occupant seating area and a second occupant seating area spaced from the first occupant seating area, the first viewing angle being toward the first occupant seating area and the second viewing angle being toward the second occupant seating area.

11. The system of claim 1, further comprising a windshield, the first viewing angle being toward the windshield to be visible as a heads-up display and the second viewing angle being angled relative to the windshield to be visible as a direct display.

12. A method comprising:
providing direct backlighting to a display device by generating a first image at a first viewing angle during a first time period by energizing an LED backlight zone to a first luminance, controlling a first LCD display zone to be at a first transparency and controlling a second LCD display zone to be non-transparent;
generating a second image at a second viewing angle during a second time period by energizing the LED backlight zone to a second luminance, controlling the first LCD display zone to be non-transparent and controlling the second LCD display zone to a second transparency; and
wherein the first luminance is transmitted through the first LCD display zone disposed over the LED backlight zone and directed at the first viewing angle by a parallax barrier when the first LCD display zone is at the first transparency and the second luminance is transmitted through the second LCD display zone disposed over the LED backlight zone and directed at a second viewing angle by the parallax barrier when the second LCD display zone is at the second transparency.

13. The method of claim 12, wherein the first viewing angle is at a first angle relative to a display substrate formed by the first and second LCD display zones and the second viewing angle is at a second angle relative to the display substrate formed by the first and second LCD display zones.

14. The method of claim 12, wherein multiple LED backlight zones and multiple first LCD display zones combine to project the first image at the first viewing angle based on the parallax barrier when the LED backlight zones are at the first luminance and the first LCD display zones are at the first transparency.

15. The method of claim 12, wherein multiple LED backlight zones and multiple second LCD display zones combine to project the second image at the second viewing angle when the LED backlight zones are at the second luminance and the second LCD display zones are at the second transparency.

16. The method of claim 12, wherein the first transparency of the first LCD display zone and the second transparency of the second LCD display zone vary over time and the first and second time periods alternate.

17. An assembly comprising:
a display substrate;
an LED backlight zone including one or more LEDs fixed to the display substrate;
the LED backlight zone being energizable to a first luminance during a first time period and the LED backlight zone being energizable to a second luminance during a second time period; and
a parallax barrier spaced from the display substrate, a first LCD display zone transparently disposed over the LED backlight zone when the LED backlight zone is energized to the first luminance during the first time period, and a second LCD display zone transparently disposed over the LED backlight zone when the LED backlight zone being energized to the second luminance during a second time period wherein the first luminance is directed at a first viewing angle by the parallax barrier and the second luminance is directed at a second viewing angle by the parallax barrier.

18. The assembly of claim 17, further comprising a vehicle dashboard supporting the display substrate, the LED backlight zone, the first LCD display zone, the second LCD display zone and the parallax barrier.

19. The assembly of claim 17, further comprising a first occupant seating area and a second occupant seating area spaced from the first occupant seating area, the first viewing angle being toward the first occupant seating area and the second viewing angle being toward the second occupant seating area.

20. The assembly of claim 17, further comprising a windshield, the first viewing angle being toward the windshield to be visible as a heads-up display and the second viewing angle being angled relative to the windshield to be visible as a direct display.

\* \* \* \* \*